(12) United States Patent  
Kotrla et al.

(10) Patent No.: US 9,644,442 B2  
(45) Date of Patent: May 9, 2017

(54) MULTI-PRESSURE FLANGE CONNECTION

(75) Inventors: Johnnie Kotrla, Katy, TX (US); Ross Stevenson, Montgomery, TX (US); Vallie Hodges, Houston, TX (US)

(73) Assignee: Cameron International Corporation, Houston, TX (US)

( * ) Notice: Subject to any disclaimer, the term of this patent is extended or adjusted under 35 U.S.C. 154(b) by 1128 days.

(21) Appl. No.: 13/141,318

(22) PCT Filed: Jan. 12, 2010

(86) PCT No.: PCT/US2010/020813  
§ 371 (c)(1),  
(2), (4) Date: Jun. 21, 2011

(87) PCT Pub. No.: WO2010/101668  
PCT Pub. Date: Sep. 10, 2010

(65) Prior Publication Data  
US 2011/0308815 A1 Dec. 22, 2011

Related U.S. Application Data

(60) Provisional application No. 61/158,323, filed on Mar. 6, 2009.

(51) Int. Cl.  
*E21B 33/038* (2006.01)  
*F16L 23/16* (2006.01)  
*F16L 23/036* (2006.01)

(52) U.S. Cl.  
CPC .......... *E21B 33/038* (2013.01); *F16L 23/036* (2013.01); *F16L 23/16* (2013.01)

(58) Field of Classification Search  
CPC . F16L 23/16; F16L 23/02; F16L 23/00; F16L 23/036

USPC .......... 285/368, 412, 12; 166/338, 344, 360, 166/378, 380, 364, 367, 368, 85.4, 75.13, 166/95, 1, 363; 277/614  
See application file for complete search history.

(56) References Cited

U.S. PATENT DOCUMENTS

| 1,389,768 A | * | 9/1921 | McFarland | 285/123.3 |
| 2,643,137 A | * | 6/1953 | Smith | 285/373 |
| 2,749,149 A | * | 6/1956 | Carpenter | 285/189 |

(Continued)

FOREIGN PATENT DOCUMENTS

| WO | WO03048512 | 6/2006 |
| WO | WO2009014797 | 1/2009 |

OTHER PUBLICATIONS

PCT Search Report and Written Opinion for PCT/US2010/020813 mailed May 17, 2010.

*Primary Examiner* — George Gray  
(74) *Attorney, Agent, or Firm* — Fletcher Yoder P.C.

(57) ABSTRACT

A multi-pressure flange is disclosed that includes a first set of fasteners comprising four fasteners in a first rectangular pattern for attachment in a first pressure rating and a second set of fasteners comprising four fasteners in a second rectangular pattern in which the first rectangular pattern is perpendicular to the second rectangular pattern. The second set of fasteners is selectively combinable with the first set of fasteners for attachment in a higher second pressure rating. The flange may include a recess to receive sealing component and a receptacle configured to receive a pipe fitting. Systems and methods including the multi-pressure flange are also disclosed.

23 Claims, 7 Drawing Sheets

(56) References Cited

U.S. PATENT DOCUMENTS

| | | | | |
|---|---|---|---|---|
| 3,095,927 | A * | 7/1963 | Rhodes | 166/97.5 |
| 3,321,217 | A | 5/1967 | Ahlstone | |
| 4,073,402 | A * | 2/1978 | Wood | 220/203.08 |
| 4,448,448 | A * | 5/1984 | Pollia | 285/112 |
| 4,984,830 | A | 1/1991 | Saunders | |
| 5,387,089 | A * | 2/1995 | Stogner et al. | 417/54 |
| 5,492,373 | A * | 2/1996 | Smith | 285/148.19 |
| 5,944,319 | A * | 8/1999 | Kohlman | 277/314 |
| 7,114,752 | B2 * | 10/2006 | Voelker | 285/302 |
| 7,424,917 | B2 * | 9/2008 | Martin | 166/335 |
| 7,921,919 | B2 * | 4/2011 | Horton, III | 166/366 |
| 8,235,125 | B2 * | 8/2012 | Borak, Jr. | 166/379 |
| 2001/0037881 | A1 * | 11/2001 | Brecheisen | 166/106 |
| 2007/0029081 | A1 * | 2/2007 | Shaw | 166/241.3 |
| 2011/0147002 | A1 * | 6/2011 | Kotrla et al. | 166/363 |

* cited by examiner

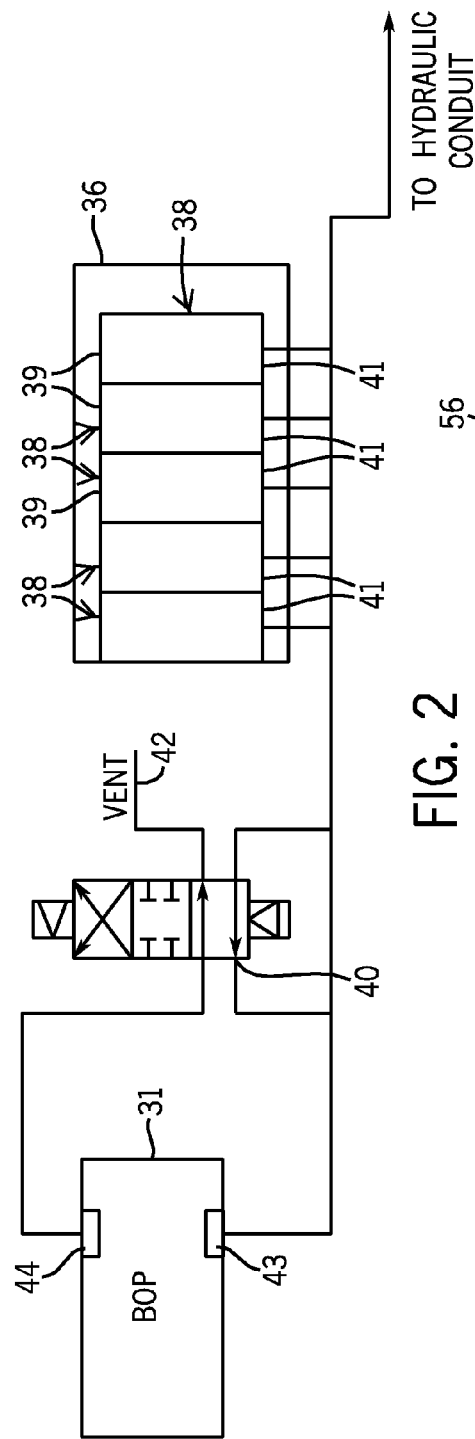
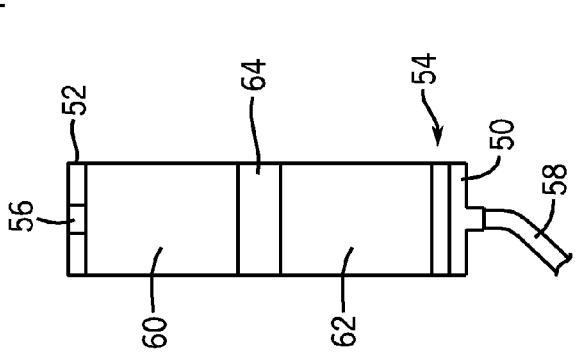
FIG. 2
FIG. 3

MULTI-PRESSURE FLANGE CONNECTION

CROSS REFERENCE TO RELATED APPLICATIONS

This application claims priority to and benefit of PCT Patent Application No. PCT/US2010/020813, entitled "Multi-Pressure Flange Connection," filed Jan. 12, 2010, which is herein incorporated by reference in its entirety, and which claims priority to and benefit of U.S. Provisional Patent Application No. 61/158,323, entitled "Multi-Pressure Flange Connection", filed on Mar. 6, 2009, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel to power modern civilization in a wide variety of mobile vehicles as well as stationary plants and factories of all kinds. Further, oil and natural gas are frequently used to heat homes during winter, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling and/or extraction operations.

Much of the equipment used in such wellhead assemblies is operated hydraulically. For example, a blowout preventer (BOP), used to control the well pressures while drilling, may rely on hydraulic pressure for operation, especially during an unanticipated overpressure condition. In subsea wellhead assemblies, the pressurized hydraulic fluid is often stored in a "gas over liquid" accumulator in close proximity to its point of need that supplies pressurized hydraulic fluid to a BOP or other equipment. Multiple accumulators may be used with a single BOP stack, and each accumulator includes a "gas-end" and a "liquid-end."

As subsea installations migrate to ever deeper water depths, such as 10,000 ft or deeper, higher hydraulic pressures are required to overcome the hydrostatic pressure at the seabed. To combat the extreme hydrostatic pressure, higher rated connections for the liquid-end of the accumulator may be used. One type of high pressure connection used is an "autoclave" style connection. However, while such connections provide a higher pressure rating, they may restrict the hydraulic fluid flow from the accumulator. The autoclave connections may be difficult and time-consuming to install and assemble to a leak-free condition. Additionally, the tubing used with the autoclave connections may be more expensive than the tubing used with the conventional connections.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 2 is a block diagram of a BOP and accumulator system in accordance with an embodiment of the present invention;

FIG. 3 is a block diagram of an accumulator and dual pressure flange in accordance with an embodiment of the present invention;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Embodiments of the present invention include a multi-pressure flange configured to couple to an accumulator of a BOP stack. In one embodiment, a multi-pressure (e.g., dual pressure) flange may include a first distinct set of fasteners and second distinct set of fasteners. For example, in one embodiment a dual-pressure flange may include a first set of fasteners in a first rectangular pattern and a second set of fasteners in a second rectangular pattern. The flange may provide different pressure ratings based on use of the either set of fasteners or the combination of the sets of fasteners. A sealing component, (e.g., a seal sub), may be disposed in the flange to seal against the accumulator. The flange may include a bore to allow passage of a fluid connection (e.g., liquid connection) to the accumulator.

Figure 1:
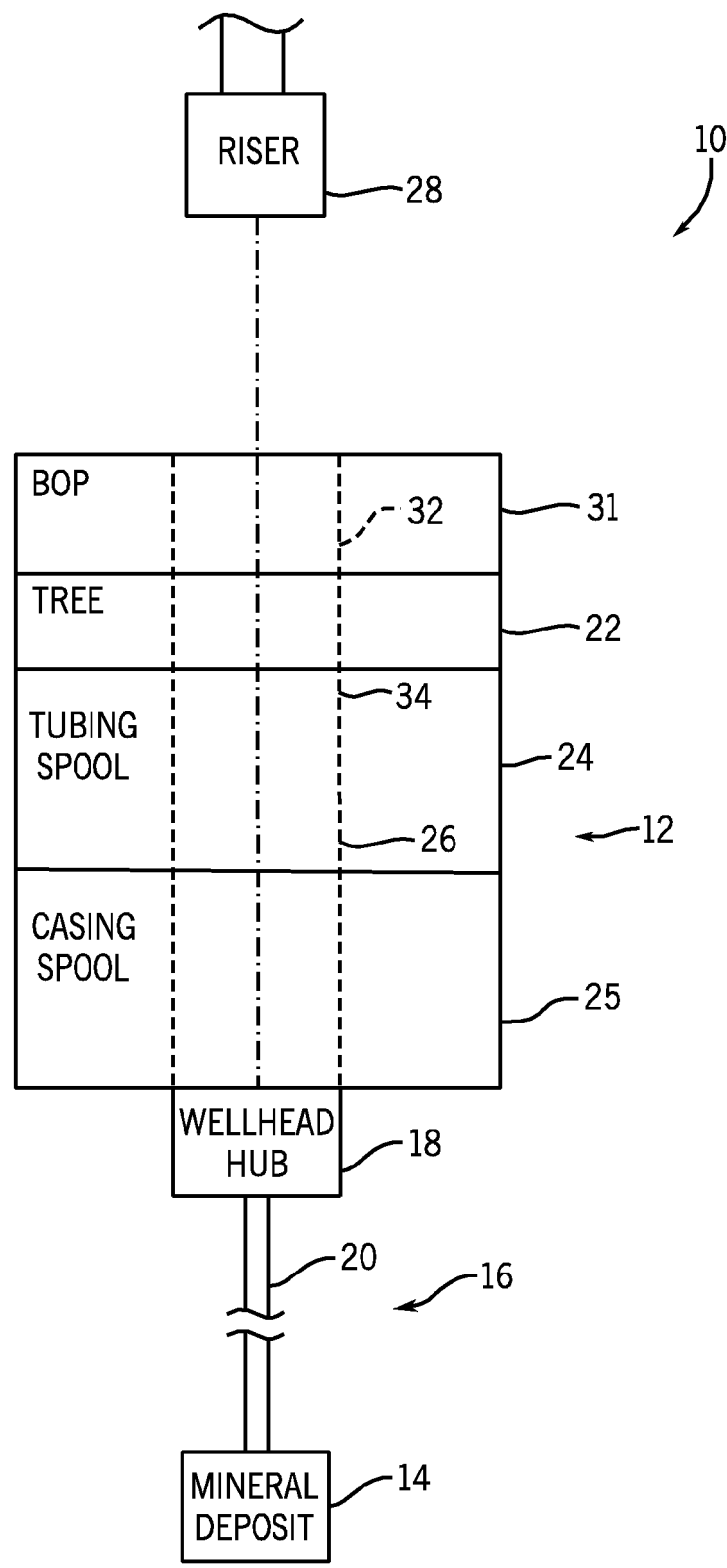
FIG. 1 is a block diagram of a mineral extraction system in accordance with an embodiment of the present invention.

FIG. 1 is a block diagram that illustrates an embodiment of a mineral extraction system 10. As discussed below, one or more multi-pressure (e.g., dual pressure) flange connections are employed throughout the system 10. The illustrated mineral extraction system 10 can be configured to extract various minerals and natural resources, including hydrocarbons (e.g., oil and/or natural gas), or configured to inject substances into the earth. In some embodiments, the mineral extraction system 10 is land-based (e.g., a surface system) or subsea (e.g., a subsea system). As illustrated, the system 10 includes a wellhead assembly 12 coupled to a mineral deposit 14 via a well 16, wherein the well 16 includes a wellhead hub 18 and a well-bore 20. The wellhead hub 18 generally includes a large diameter hub that is disposed at the termination of the well-bore 20. The wellhead hub 18 provides for the sealable connection of the wellhead assembly 12 to the well 16.

The wellhead assembly 12 typically includes multiple components that control and regulate activities and conditions associated with the well 16. For example, the wellhead assembly 12 generally includes bodies, valves and seals that route produced minerals from the mineral deposit 14, provide for regulating pressure in the well 16, and provide for the injection of chemicals into the well-bore 20 (down-hole). In the illustrated embodiment, the wellhead assembly 12 includes what is colloquially referred to as a Christmas tree 22 (hereinafter, a tree), a tubing spool 24, a casing spool 25, and a hanger 26 (e.g., a tubing hanger or a casing hanger). The system 10 may include other devices that are coupled to the wellhead assembly 12, and devices that are used to assemble and control various components of the wellhead assembly 12. For example, in the illustrated embodiment, the system 10 includes a riser 28 coupled to a floating rig (not shown).

The tree 22 generally includes a variety of flow paths (e.g., bores), valves, fittings, and controls for operating the well 16. For instance, the tree 22 may include a frame that is disposed about a tree body, a flow-loop, actuators, and valves. Further, the tree 22 may provide fluid communication with the well 16. For example, the tree 22 includes a tree bore 32. The tree bore 32 provides for completion and workover procedures, such as the insertion of tools (e.g., the hanger 26) into the well 16, the injection of various chemicals into the well 16 (down-hole), and the like. Further, minerals extracted from the well 16 (e.g., oil and natural gas) may be regulated and routed via the tree 22. For instance, the tree 12 may be coupled to a jumper or a flowline that is tied back to other components, such as a manifold. Accordingly, produced minerals flow from the well 16 to the manifold via the wellhead assembly 12 and/or the tree 22 before being routed to shipping or storage facilities. A blowout preventer (BOP) 31 may also be included during drilling or workover operations, either as a part of the tree 22 or as a separate device. The BOP may consist of a variety of valves, fittings and controls to prevent oil, gas, or other fluid from exiting the well in the event of an unintentional release of pressure or an unanticipated overpressure condition. These valves, fittings, and controls may also be referred to as a "BOP stack."

The tubing spool 24 provides a base for the tree 22. Typically, the tubing spool 24 is one of many components in a modular subsea or surface mineral extraction system 10 that is run from an offshore vessel or surface system. The tubing spool 24 includes a tubing spool bore 34. The tubing spool bore 34 sealably connects (e.g., enables fluid communication between) the tree bore 32 and the well 16. Thus, the tubing spool bore 34 may provide access to the well bore 20 for various completion and worker procedures. For example, components can be run down to the wellhead assembly 12 and disposed in the tubing spool bore 34 to seal-off the well bore 20, to inject chemicals down-hole, to suspend tools down-hole, to retrieve tools down-hole, and the like.

The BOP 31 may be hydraulically operated and may close the wellhead assembly 12 or seal off various components of the wellhead assembly 12. To enable hydraulic operation of the BOP 31, the BOP 31 may be coupled to a source of hydraulic pressure, e.g., pressurized hydraulic fluid. FIG. 2 is a block diagram of the BOP 31 and an accumulator bank 36 in accordance with an embodiment of the present invention. The accumulator bank 36 may include one or more accumulators 38. The accumulator bank 36 may house the accumulators 38, providing easier installation and operation of the accumulators 38. In some embodiments, a group of accumulators 38 may also be referred to as a "module" or a "rack." A control valve 40 may also be included to control the BOP 31 and the accumulator bank 36. The control valve 40 may also include a vent 42. The BOP 31 may include an open port 43 and a close port 44. The accumulators 38 may provide pressurized hydraulic fluid to either the open port 43 or close port 44, as determined by the control valve 40, to open or close the BOP 31.

The accumulators 38 output pressurized hydraulic fluid to the BOP 31. Thus, the accumulators 38 may be referred to as having a gas end 39 and a liquid end 41. As shown in FIG. 2, the liquid end 41 may be coupled to the control valve 40 and to a hydraulic conduit. The accumulators 38 provide pressurized hydraulic fluid to the BOP 31 to enable operation of the BOP via hydraulic pressure. In some embodiments, the BOP 31 (i.e., BOP stack) may include anywhere from about 10 to over 100 accumulators (depending on size, rack configurations, BOP size, rated water depth, the number of hydraulic circuits, and other factors).

Once the BOP 31 is coupled to the wellhead assembly 12, the accumulators 36 may provide charging of the BOP 31 with the hydraulic fluid from a liquid end 41 of the accumulator. In some embodiments, the working hydraulic pressure of the control system for the BOP 31 may be about 5,000 psi. However, in a subsea installation, the precharge pressure of the gas may be higher than the maximum system pressure to overcome the subsea hydrostatic pressure (approximately 0.5 psi/ft of water depth) and the minimum system pressure required to operate the BOP 31. In such an embodiment, the gas end 39 of the accumulators 38 is typically capable of a higher rated pressure than the liquid end 41. According to industry standards, the pressure rating of each accumulator 38 may be determined as the pressure rating of its lowest rated connection. Thus, if a specific pressure rating is desired, the lowest rated end connection must be selected to achieve the desired pressure rating.

While conventional accumulators may be rated from about 5000 psi to about 6000 psi (e.g., the pressure rating for the accumulator matches the pressure rating of the gas end 39), deeper subsea wellhead assemblies may include higher pressures. The present embodiments provide a multi-pressure (e.g., dual pressure) flange capable of supporting pressure ratings for high pressure subsea installations (e.g., at least about 12,000 psi) and pressure ratings for low pressure installations (e.g., at least about 6,000 psi). As used herein, the terms "high pressure" and "low pressure" are relative terms used to refer to a relationship between two pressures.

FIG. 3 depicts a block diagram of a multi-pressure (e.g., dual pressure) flange 50 and an accumulator 38 in accordance with an embodiment of the present invention. In the following discussion, the flange 50 is generally described as a dual-pressure flange 50. However, various embodiments of the flange 50 may be a tri-pressure flange, a quad-pressure flange, or some other multi-pressure flange. The accumulator 38 includes a gas end 52 and a liquid connection 54. The accumulator 38 may be precharged with gas. For example, the accumulators 38 of a bank 36 may each be precharged with gas on the surface before installation, such as via a valve 56. The liquid connection 54 may be connected to the BOP 31 (or other hydraulic component) of a wellhead assembly 12 via a pipe 58.

The accumulator 38 may include a plurality of chambers, such chambers 60 and 62, for receiving gases and fluids. For example, in one embodiment the chamber 60 may be precharged with gas through the valve 56, and may output pressurized hydraulic liquid from the chamber 62 through the connection 54.

The gas end 52 and liquid connection 54 may be separated by an energy storage and transfer device 64. In some embodiments, the energy storage and transfer device 64 may be a piston, an elastomeric bladder, or any other suitable device or combination thereof. The energy storage and transfer device 64 may isolate the chambers of the accumulator 38, such as isolating chamber 60 from 62. The energy transfer and storage device 64 transfers energy (such as from the pressurized gas from the chamber 60) and controls flow of the hydraulic fluid in and out of the accumulator through the connection 54.

As described above, in certain installations, it may be desirable to have a specific pressure rating for the gas end 52 and/or the connection 54. The dual pressure flange 50 may couple to the connection 54 of the accumulator 38 to provide the desired pressure rating and allow connection of the liquid line 58. For example, as described further below, the dual pressure flange 50 provides connection and sealing capability to enable use in a deep water subsea installation of the accumulator 38, such as for pressure ratings of at least about 10,000 psi. Further, the dual pressure flange 50 provides connection and sealing capability to enable use in conventional subsea installations, such as for pressure ratings of at least about 6,000 psi.

Figure 4A:
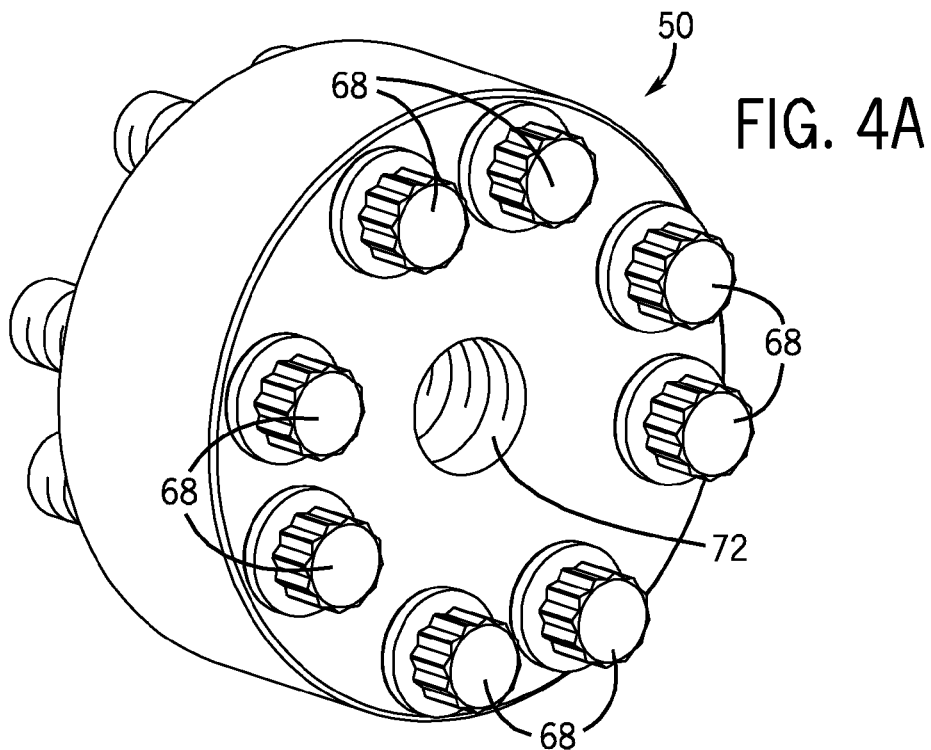
FIGS. 4A and 4B are front and rear perspective views of the dual pressure flange of FIG. 3 in accordance with an embodiment of the present invention.
Figure 4B:
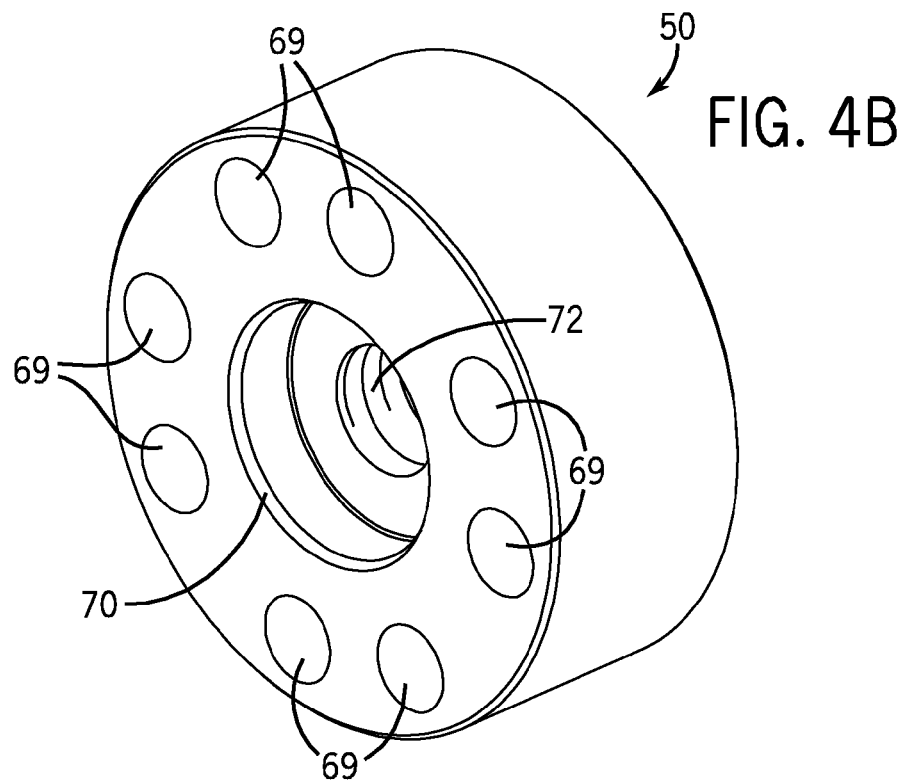

FIGS. 4A and 4B depict a front perspective view and a rear perspective view respectively of the dual pressure flange 50 in accordance with an embodiment of the present invention. As shown in FIG. 4A, the dual pressure flange 50 includes eight fasteners, such as attaching bolts 68, arranged in two rectangular four-bolt patterns, as described further below. In some embodiments, the fasteners may be threaded to enable coupling to the connection 54 of the accumulator 38. As shown in FIG. 4B, the bolts 68 are removed from the flange 50 to illustrate a plurality of holes 69 (e.g., threaded receptacles) that receive the bolts 68. The holes 68 are also arranged in two rectangular four-hole patterns, as described further below.

Figure 5:
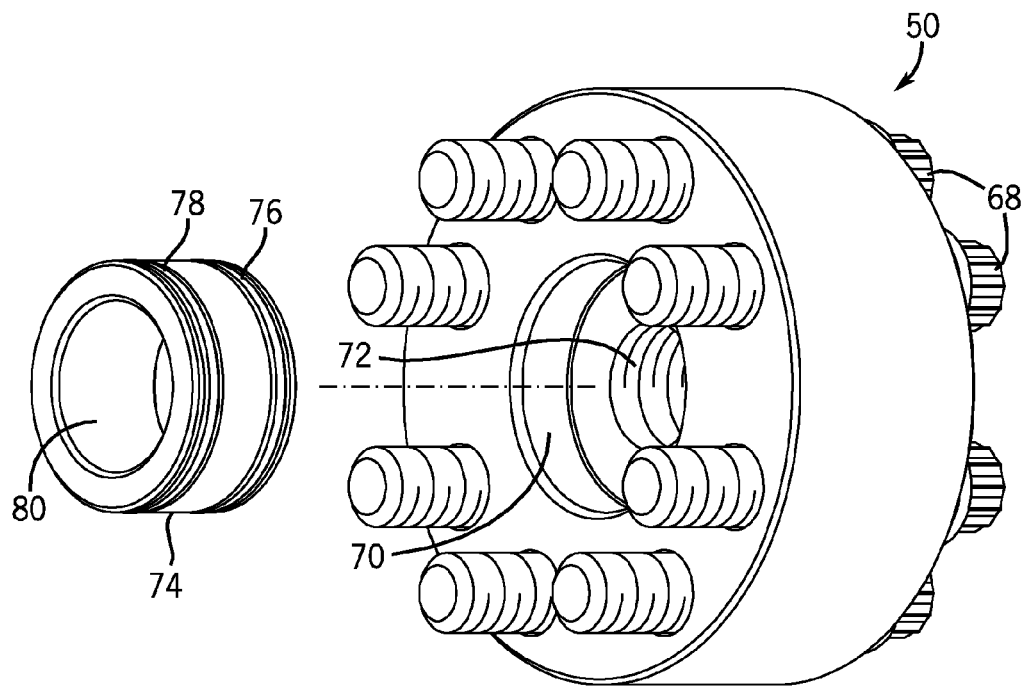
FIG. 5 is an exploded front perspective view of the dual pressure flange and a seal component that may be used with the dual pressure flange in accordance with an embodiment of the present invention.

The dual pressure flange 50 also includes a receptacle 70 configured to receive a sealing mechanism, such as the seal component described in FIG. 5. Additionally, the dual pressure flange 50 includes a threaded connection 72 that may receive a fitting, pipe, or other component to transport fluid through the flange 50 into and out of the accumulator 38. For example, in one embodiment, the threaded connection 72 may include National Pipe Thread (NPT) threads. The flange 50 may comprise or consist essentially of steel or any other suitable alloy. In one embodiment, the flange 50 may consist essentially of type 316 stainless steel.

FIG. 5 depicts a perspective view of a sealing component, such as a seal sub 74, and the dual pressure flange 50 in accordance with an embodiment of the present invention. The seal sub 74 may be used to aid in sealing the dual pressure flange 50 when installed on the accumulator 38. The seal sub 74 may include a first seal 76 configured to seal against the flange 50 (such as by against the walls of the receptacle 70) and a second seal 78 configured to seal against the connection 54 on the accumulator 38 when the sub seal 74 is installed. In some embodiments, the first seal 76 and second seal 78 may comprise o-rings. The seal sub 74 includes a hole 80 through which gas or fluid may flow though the flange 50 and into and out of the accumulator 38. Additionally, the threaded connection 72 and hole 80 may provide increased flow capacity over conventional "autoclave" connections, resulting in lower response times for the BOP 31.

Figure 6:
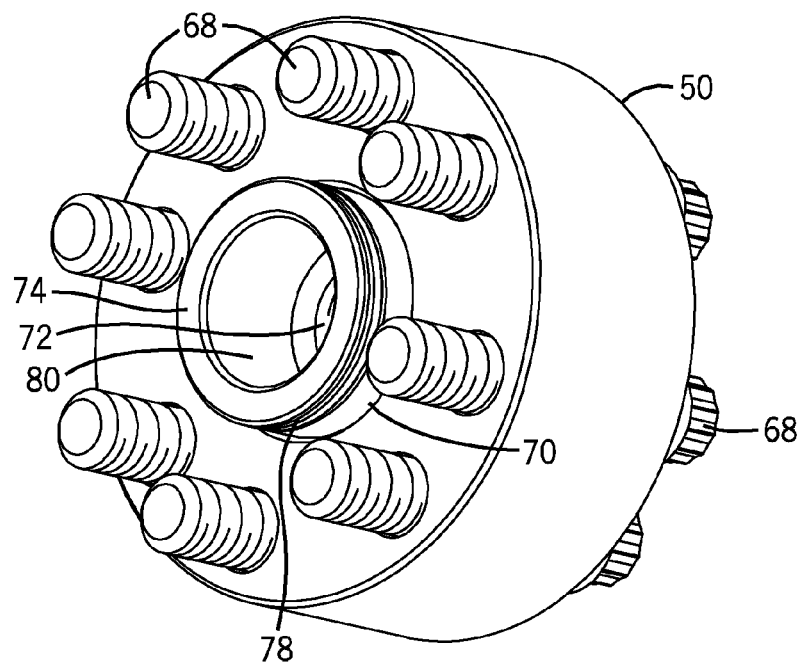
FIG. 6 a front perspective view of the assembled dual pressure flange and seal component in accordance with an embodiment of the present invention.

FIG. 6 depicts a rear perspective view of the assembled dual pressure flange 50 and the seal sub 74 in accordance with an embodiment of the present invention. As shown in FIG. 6, the seal sub 74 inserts into the receptacle 70 such that the first seal 76 engages the walls of the receptacle 70. The second seal 78 remains outside the receptacle 70 to provide sealing against a connection when the flange 50 installed. The seal sub 74 "floats" (as indicated by arrows 75) between the flange 50 and the connection 54 of the accumulator 38. For repair or replacement, the seal sub 74 may be removed from the flange 50.

Figure 7:
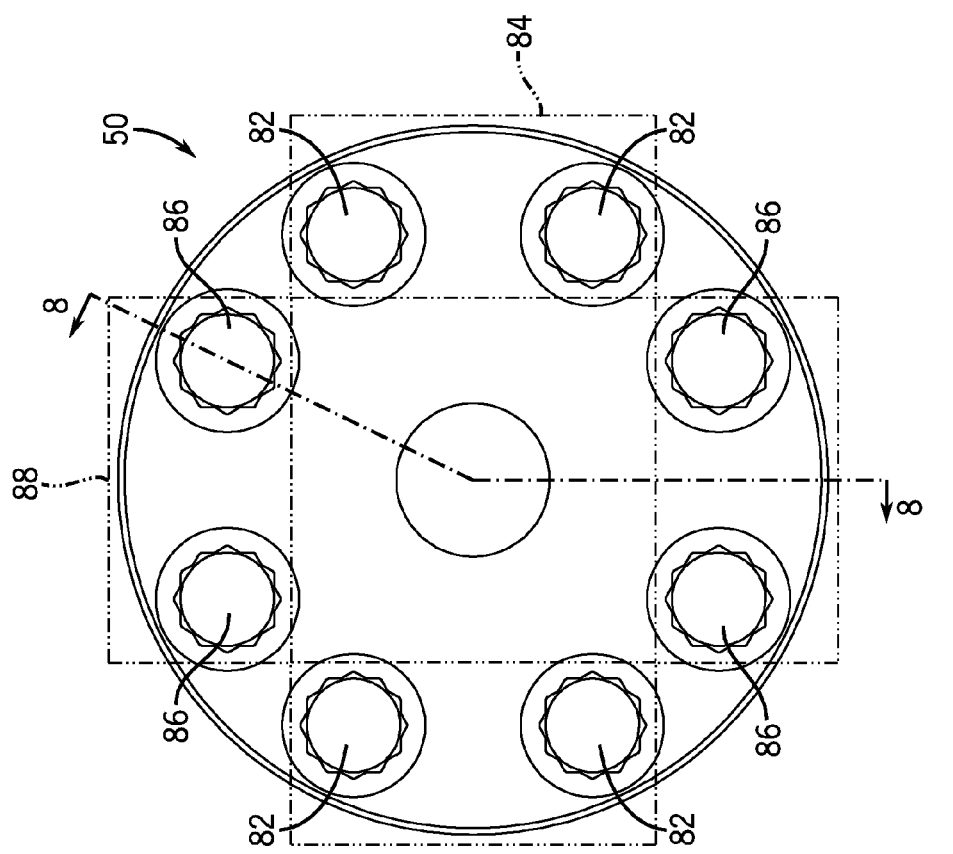
FIG. 7 depicts a front view of the dual pressure flange in accordance with an embodiment of the present invention.

FIG. 7 depicts a front view of the dual pressure flange in accordance with an embodiment of the present invention. As seen more clearly in FIG. 7, when assembled, the threaded connection 72 of the flange 50 and the hole 80 of the seal sub 74 align to allow insertion of a pipe fitting, or other component to allow fluid or gas flow in and out of the accumulator 38. As described above, the dual pressure flange 50 includes eight attaching bolts 68 arranged in two rectangular four-bolt patterns. The rectangular patterns may be displaced at 90° to each other. For example, as shown in FIG. 7, a first group 82 of four bolts may be arranged in a first rectangular pattern 84, and a second group 86 of four bolts may be arranged in a second rectangular pattern 88. As described further below, when using the dual pressure flange 50 in a low-pressure configuration (e.g., at least about 6,000 psi) such that only four bolts are used to secure the flange to a connection of an accumulator, the two rectangular patterns 84 and 88 allow easier orientation of the flange 50 during installation onto a connection. For example, when installing with four bolts, either one of the two rectangular patterns 84 and 88 may be aligned with the respective mating surface for the flange 50. As shown in FIG. 7, the first group 82 of four bolts and the second group 86 of four bolts are not uniformly spaced between the first rectangular pattern 84 and the second rectangular pattern 88.

Figure 8:
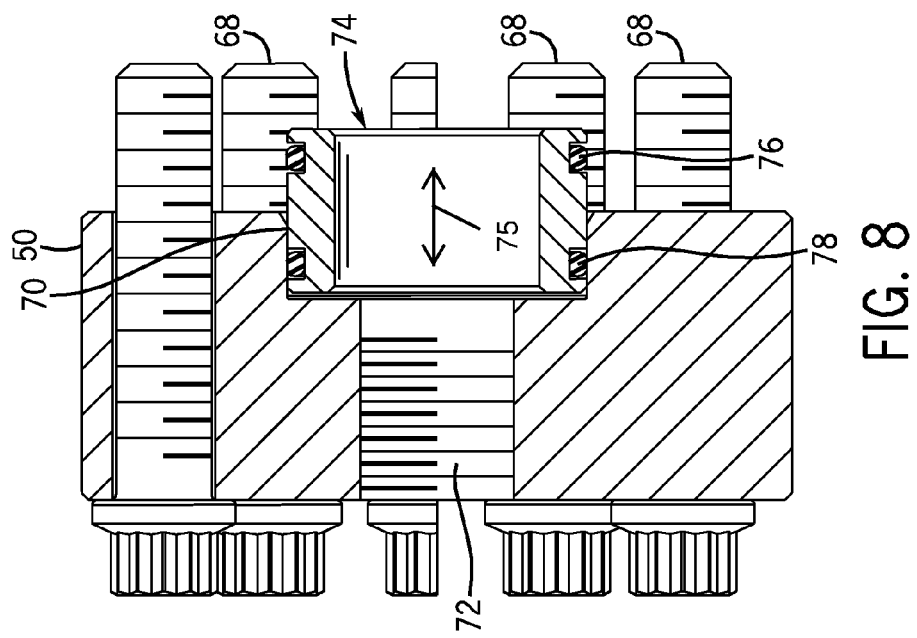
FIG. 8 depicts a cross-section of the assembled dual pressure flange and seal component taken along line 7-7 of FIG. 7 in accordance with an embodiment of the present invention.

FIG. 8 is a cross-sectional view of the dual pressure flange 50 taken along line 7-7 of FIG. 7 in accordance with an embodiment of the present invention. As illustrated in FIG. 8, the flange 50 receives the seal sub 74 such that the seal sub 74 (and the included seals 76 and 78) provides an enhanced sealing mechanism against the connection of the accumulator (as opposed to the sealing provided by a face seal of the flange 50). Additionally, because of the positioning of the seal sub, i.e., "floating" (as indicated by arrows 75) in the flange 50 and the connection 54 of the accumulator 38, the integrity of the seal between the flange 50 and the connection 54 is not dependent on the makeup torque on the attaching bolts 68 when installing the flange 50. Further, use of the seal sub 74 may eliminate machining requirements for the face of the flange 50. However, in a low pressure configuration, as described below in FIGS. 9A and 9B, the seal sub 74 may be omitted from the installed flange 50.

Figure 9A:
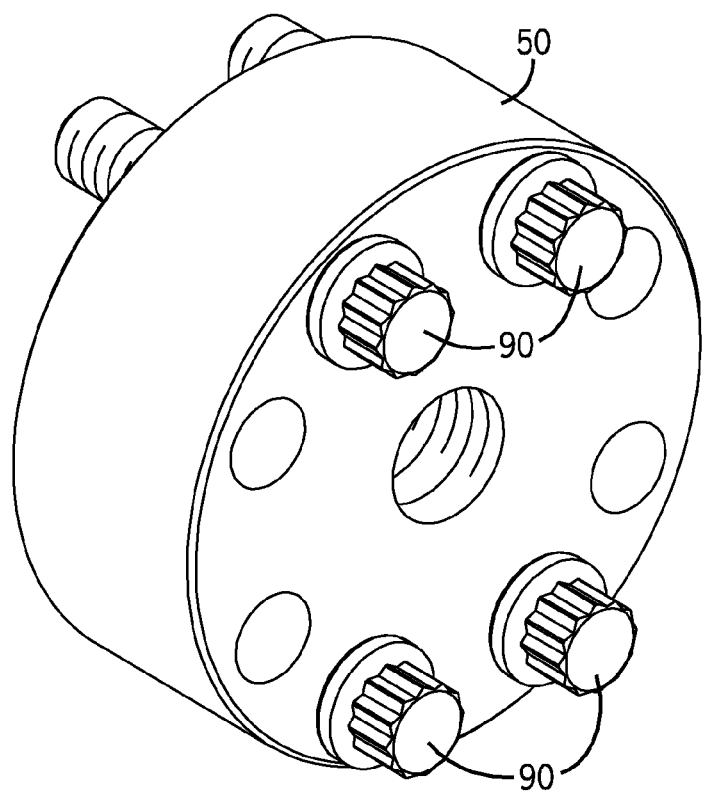
FIGS. 9A and 9B depict a front and rear perspective view respectively of the dual pressure flange in a low pressure configuration in accordance with an embodiment of the present invention.
Figure 9B:
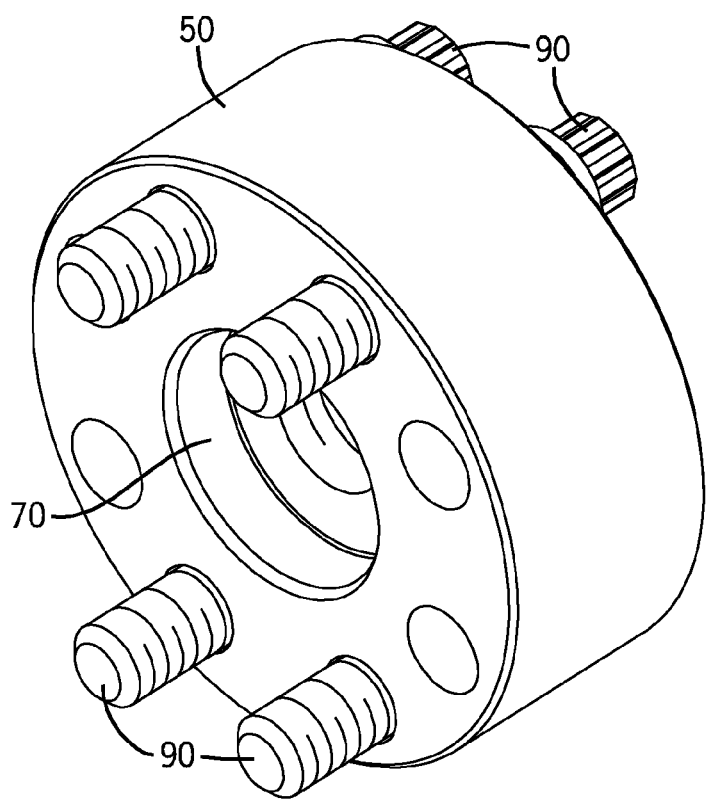

FIGS. 9A and 9B depict a front and rear perspective view respectively of the dual pressure flange 50 in a low pressure configuration in accordance with an embodiment of the present invention. In a low pressure configuration, the flange 50 may include four attaching bolts 90 arranged in one of the rectangular patterns 84 or 88. The four attaching bolts 90 may be used to secure the flange as a low pressure (e.g., at least about 6,000 psi) connection.

In other embodiments, eight attaching bolts may remain in the flange 50 in the low pressure configuration, so that the flange 50 may be more easily oriented during installation to ensure that one of the two rectangular patterns 84 or 88 of the bolts 90 couple with the low pressure connection on the accumulator 38. Advantageously, the low pressure configuration of the dual pressure flange 50 allows the flange 50 to function as a conventional Society of Automotive Engineers (SAE) Code 62 flange. In this configuration, the flange 50 may be usable with any equipment configured to use or connect via an SAE Code 62 flange. In such an embodiment, the dual pressure flange 50 may be used with or without the seal sub 74. In some embodiments, the sealing function may be provided by a face seal of the flange 50 sealing against the connection 54. However, in contrast to the embodiments discussed above, use of face seal makes the sealing capability of the flange 50 sensitive to the makeup torque on the bolts 90 when installing the flange, and may also make the flange 50 susceptible to pressure induced face flange separation. A face seal may also be used in a high pressure flange configuration that uses eight bolts in both rectangular patterns 84 and 88 to couple the flange 50.

The flange 50 may be coupled to a family of different components to achieve different pressure ratings. For example, the low pressure configuration, e.g., using four bolts of the flange 50, may be used to couple the flange 50 to a first component to achieve a first pressure rating. Similarly, a higher pressure configuration, e.g., using eight bolts of the flange 50, may be used to couple the flange 50 to a second component to achieve a second pressure rating.

Figure 10:
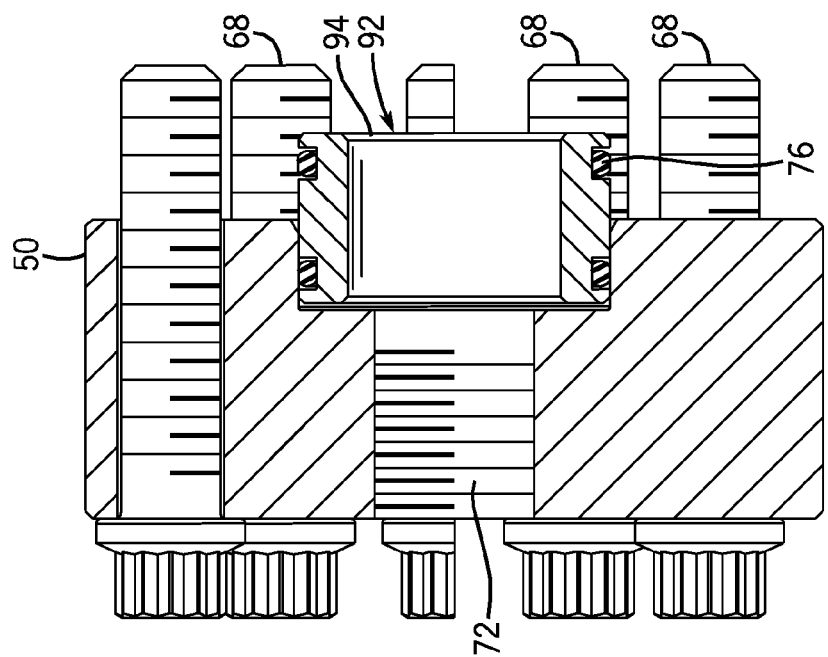
FIG. 10 is a cross-sectional view of the dual pressure flange taken along line 7-7 of FIG. 7 in accordance with an alternate embodiment of the present invention.

FIG. 10 is a cross-sectional view of the dual pressure flange 50 taken along line 7-7 of FIG. 7 in accordance with an alternate embodiment of the present invention. In the embodiment depicts in FIG. 10, the dual pressure flange 50 may be designed and manufactured without a cavity for the seal sub 74. Instead, the dual pressure flange 50 may include an integral seal sub nose 92. The integral seal sub nose 92 may include an external groove 94 configured to receive a seal, such as an o-ring. The integral seal sub nose 92 is configured to penetrate the seal sub sealing counterbore and may eliminate a potential leak path between the inner diameter of the flange 50 and the outer diameter of the seal sub 74. Further, the integral seal sub nose 92 may eliminate the "floating" capability of the seal, e.g., o-ring, disposed in the external groove 94.

Figure 11:
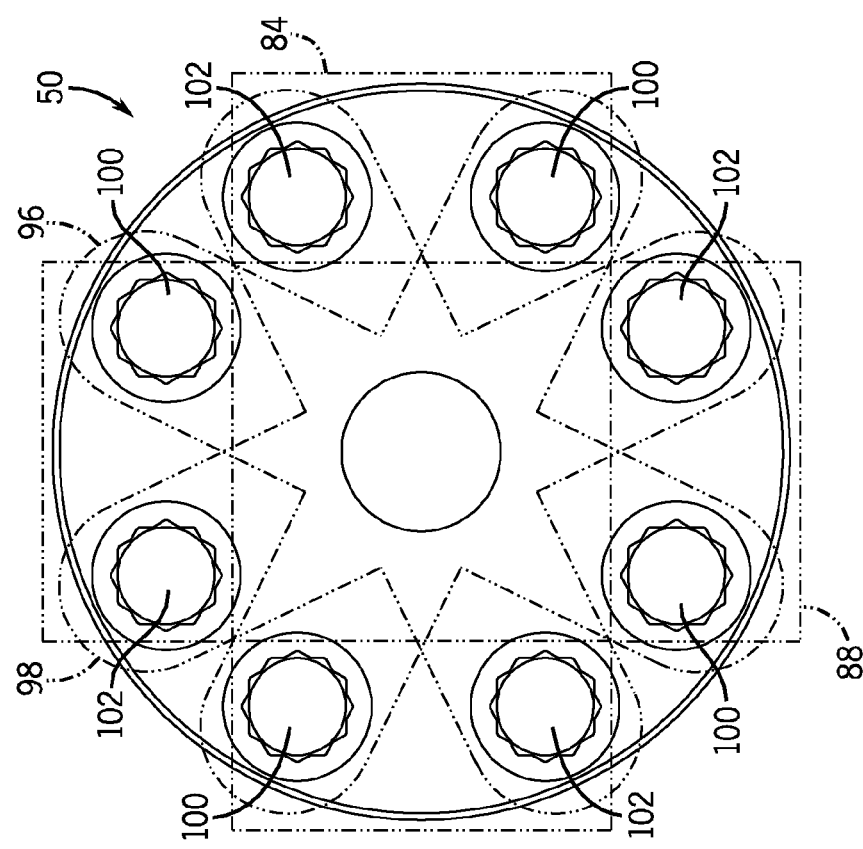
FIG. 11 depicts a front view of the dual pressure flange in accordance with an alternate embodiment of the present invention.

FIG. 11 depicts a front view of the dual pressure flange in accordance with an alternate embodiment of the present invention. The embodiment depicts in FIG. 11 includes additional bolt patterns, e.g., a first cross pattern 96 and a second cross pattern 98, that may be used in sealing the flange 50. The first cross pattern may include four bolts 100, wherein each pair of the four bolts 100 includes two bolts radially across from each other, as shown in FIG. 11. Similarly, the second cross pattern 98 may include four bolts 102, wherein each pair of the four bolts 102 also includes two bolts radially across from each other. When installing the flange 50 in either a four-bolt or eight-bolt, any combination of first rectangular pattern 84, second rectangular pattern 88, first cross pattern 96, and second cross pattern 98 may be used to achieve a desired pressure rating and withstand the exerted pressure loads.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for a mineral extraction system, comprising:
    a multi-pressure accumulator flange, comprising:
        a first set of fasteners comprising four fasteners in a first pattern for attachment in a first pressure rating, wherein the first pattern comprises a first rectangular pattern or a first cross-shaped pattern;
        a second set of fasteners comprising four fasteners in a second pattern, wherein the second pattern comprises a second rectangular pattern or a second cross-shaped pattern, the first pattern is perpendicular to the second pattern, the second set of fasteners is selectively combinable with the first set of fasteners in a third pattern for attachment in a second pressure rating, and the second pressure rating is higher than the first pressure rating, wherein the fasteners are not uniformly spaced between the first and second patterns;
        a recess configured to receive a sealing component, wherein the sealing component comprises a cylindrical sealing component comprising first and second seals axially offset from one another, the sealing component is configured to float lengthwise along the recess across a mounting interface, the first seal is disposed in the recess between the cylindrical sealing component and the multi-pressure accumulator flange, and the second seal is disposed on a protruding portion of the cylindrical sealing component outside of the recess; and a receptacle configured to receive a pipe fitting.

2. The apparatus of claim 1, wherein the first set of fasteners have a first fastener spacing within the first pattern, the second set of fasteners have a second fastener spacing within the second pattern, the fasteners have a third fastener spacing between the first and second patterns, and the third fastener spacing is less than both the first fastener spacing and the second fastener spacing.

3. The apparatus of claim 1, comprising a plurality of components having different pressure ratings, wherein a first component in the plurality is configured to mate with the first set of fasteners in the first pattern at the first pressure rating, and a second component in the plurality is configured to mate with both the first and second sets of fasteners in the third pattern at the second pressure rating.

4. The apparatus of claim 1, wherein the sealing component comprises a hole configured to align with the receptacle.

5. The apparatus of claim 1, wherein the first and second seals comprise respective first and second o-rings.

6. The apparatus of claim 1, wherein the first set of fasteners and the second set of fasteners comprise bolts or receptacles.

7. The apparatus of claim 1, wherein the first pattern comprises the first rectangular pattern and the second pattern comprises the second rectangular pattern.

8. The apparatus of claim 1, wherein the first pattern comprises the first cross-shaped pattern and the second pattern comprises the second cross-shaped pattern.

9. The apparatus of claim 1, wherein the first pattern is mutually exclusively arranged in the first rectangular pattern and the first cross-shaped pattern, and the second pattern is mutually exclusively arranged in the second rectangular pattern and the second cross-shaped pattern.

10. The apparatus of claim 1, wherein the first pressure rating is at least 5,000 psi and the second pressure rating is at least 10,000 psi.

11. An apparatus for a mineral extraction system, comprising:
a plurality of components having a plurality of different pressure ratings, wherein the plurality of components comprises a first component having a first pressure rating, the plurality of components comprises a second component having a second pressure rating, and the second pressure rating is higher than the first pressure rating; and
a multi-pressure flange configured to selectively mate with components in the plurality of components, wherein the multi-pressure flange comprises:
a cylindrical sealing component disposed in a cylindrical recess adjacent a mounting interface, the cylindrical sealing component comprises first and second seals axially offset from one another, the cylindrical sealing component is configured to float lengthwise along the cylindrical recess across the mounting interface, the first seal is disposed in the cylindrical recess between the cylindrical sealing component and the multi-pressure flange, and the second seal is disposed on a protruding portion of the cylindrical sealing component outside of the cylindrical recess;
a plurality of fasteners arranged circumferentially about the multi-pressure flange with a non-uniform spacing to define a plurality of distinct patterns associated with the plurality of different pressure ratings;

a first pattern of the plurality of distinct patterns comprising a first set of fasteners configured to mate with the first component at the first pressure rating;
a second pattern of the plurality of distinct patterns comprising a second set of fasteners; and
a third pattern of the plurality of distinct patterns comprising a third set of fasteners configured to mate with the second component at the second pressure rating, wherein the third set of fasteners comprises both the first set of fasteners and the second set of fasteners;
wherein the multi-pressure flange is configured to enable the single multi-pressure flange to combine with the entire plurality of components at the different pressure ratings for the mineral extraction system via the plurality of distinct patterns.

12. The apparatus of claim 11, wherein the plurality of components comprise a plurality of accumulators.

13. The apparatus of claim 12, comprising a blowout preventer (BOP) coupled to the plurality of accumulators.

14. The apparatus of claim 13, wherein the each of the plurality of accumulators comprises a gas-end and a liquid-end, wherein the multi-pressure flange is configured to couple to the liquid-end.

15. The apparatus of claim 13, comprising a control valve coupled to the BOP and to the plurality of accumulators.

16. The apparatus of claim 11, wherein the first pattern comprises a first rectangular pattern or a first cross-shaped pattern, the second pattern comprises a second rectangular pattern or a second cross-shaped pattern, and the third pattern comprises a combination of the first and second patterns.

17. The apparatus of claim 11, wherein the first set of fasteners has a first circumferential spacing within the first set of fasteners, the second set of fasteners has a second circumferential spacing within the second set of fasteners, and the third set of fasteners has a third circumferential spacing that changes between the first set of fasteners and the second set of fasteners.

18. The apparatus of claim 11, wherein the non-uniform spacing of the plurality of fasteners comprises a plurality of first spacings and a plurality of second spacings, wherein the first spacings are greater than the second spacings.

19. A mineral extraction system, comprising:
a blowout preventer (BOP);
an accumulator bank coupled to the BOP and comprising a plurality of accumulators; and
a multi-pressure flange coupled to one of the plurality of accumulators, wherein the multi-pressure flange comprises:
a cylindrical sealing component disposed in a cylindrical recess adjacent a mounting interface, the cylindrical sealing component comprises first and second seals axially offset from one another, the cylindrical sealing component is configured to float lengthwise along the cylindrical recess across the mounting interface, the first seal is disposed in the cylindrical recess between the cylindrical sealing component and the multi-pressure flange, and the second seal is disposed on a protruding portion of the cylindrical sealing component outside of the cylindrical recess; and
a plurality of receptacles including a first set of four receptacles arranged in a first pattern and a second set of four receptacles are arranged in a second pattern, the first pattern comprises a first rectangular pattern or a first cross-shaped pattern, the second pattern comprises a second rectangular pattern or a second cross-shaped pattern, and the plurality of receptacles are non-uniformly spaced circumferentially around an axis of the multi-pressure flange;

wherein the multi-pressure flange further comprises a first configuration comprising eight fasteners disposed in the receptacles such that the flange has a pressure rating of at least 10,000 psi and a second configuration comprising four fasteners disposed in the first pattern or the second pattern such that the flange has a pressure rating of at least 5,000 psi.

20. The system of claim 19, wherein the first configuration comprises the cylindrical sealing component, and the second configuration comprises a face seal.

21. A method, comprising:
selectively attaching a multi-pressure flange to a component in a plurality of mineral extraction components, wherein the mineral extraction components have different pressure ratings, the plurality of components comprises a first component having a first pressure rating, the plurality of components comprises a second component having a second pressure rating, and the second pressure rating is higher than the first pressure rating, wherein selectively attaching comprises:
coupling a first set of fasteners with the first component at the first pressure rating with or without an optional second set of fasteners; and
coupling a third set of fasteners with the second component at the second pressure rating, wherein the third set of fasteners comprises both the first set and the second set of fasteners;
wherein the first and second sets of fasteners are arranged in respective first and second patterns, the fasteners are not uniformly spaced between the first and second patterns, and the multi-pressure flange is configured to enable the single multi-pressure flange to combine with the entire plurality of mineral extraction components at different pressure ratings.

22. The method of claim 21, wherein the first pattern comprises a first rectangular pattern or a first cross-shaped pattern, and the second pattern comprises a second rectangular pattern or a second cross-shaped pattern.

23. The method of claim 21, wherein selectively attaching comprises disposing a sealing component in the multi-pressure flange.

* * * * *